V. G. APPLE.
CONTROLLER SWITCH.
APPLICATION FILED AUG. 8, 1912.
1,070,657.
Patented Aug. 19, 1913.
8 SHEETS—SHEET 3.
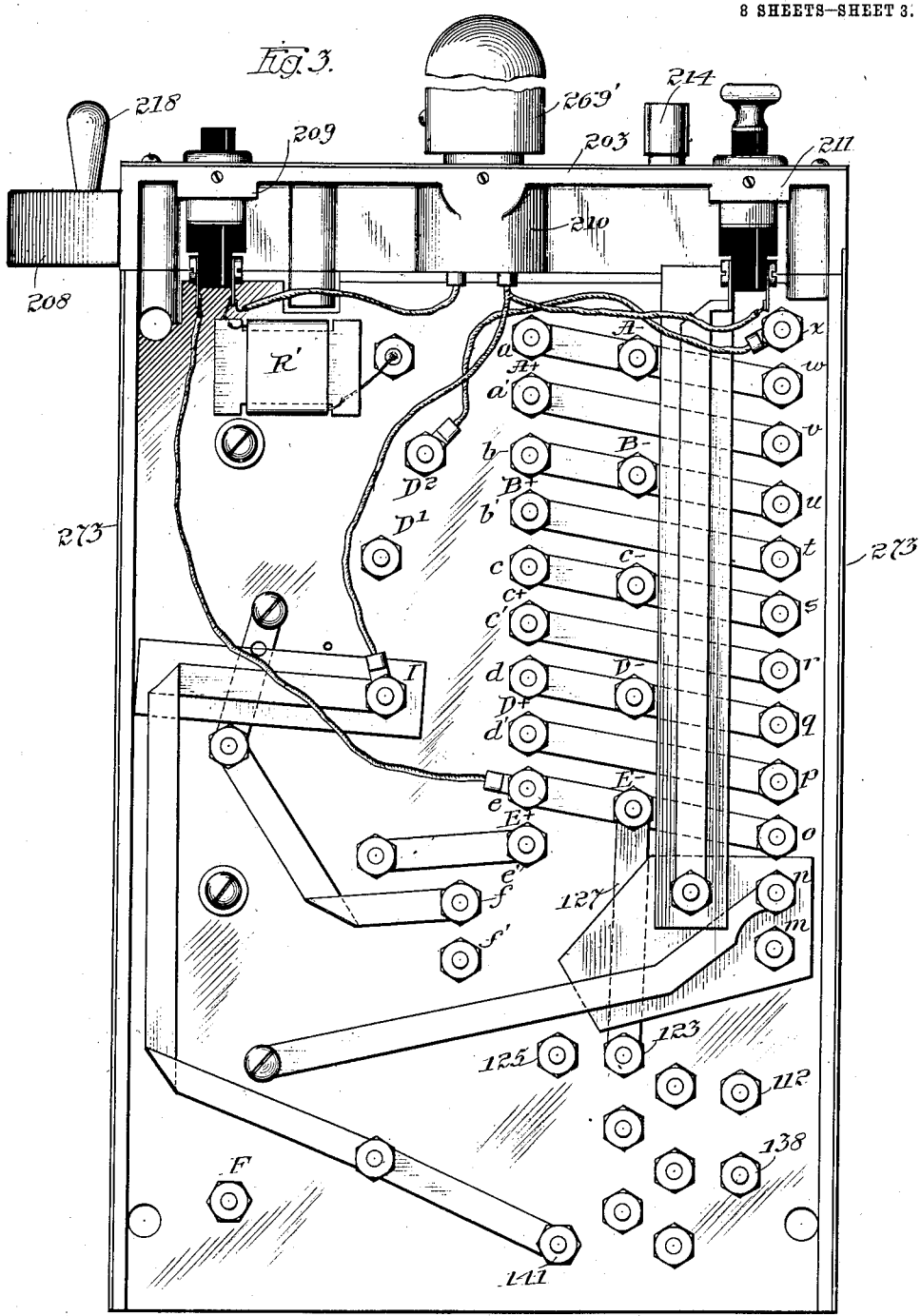

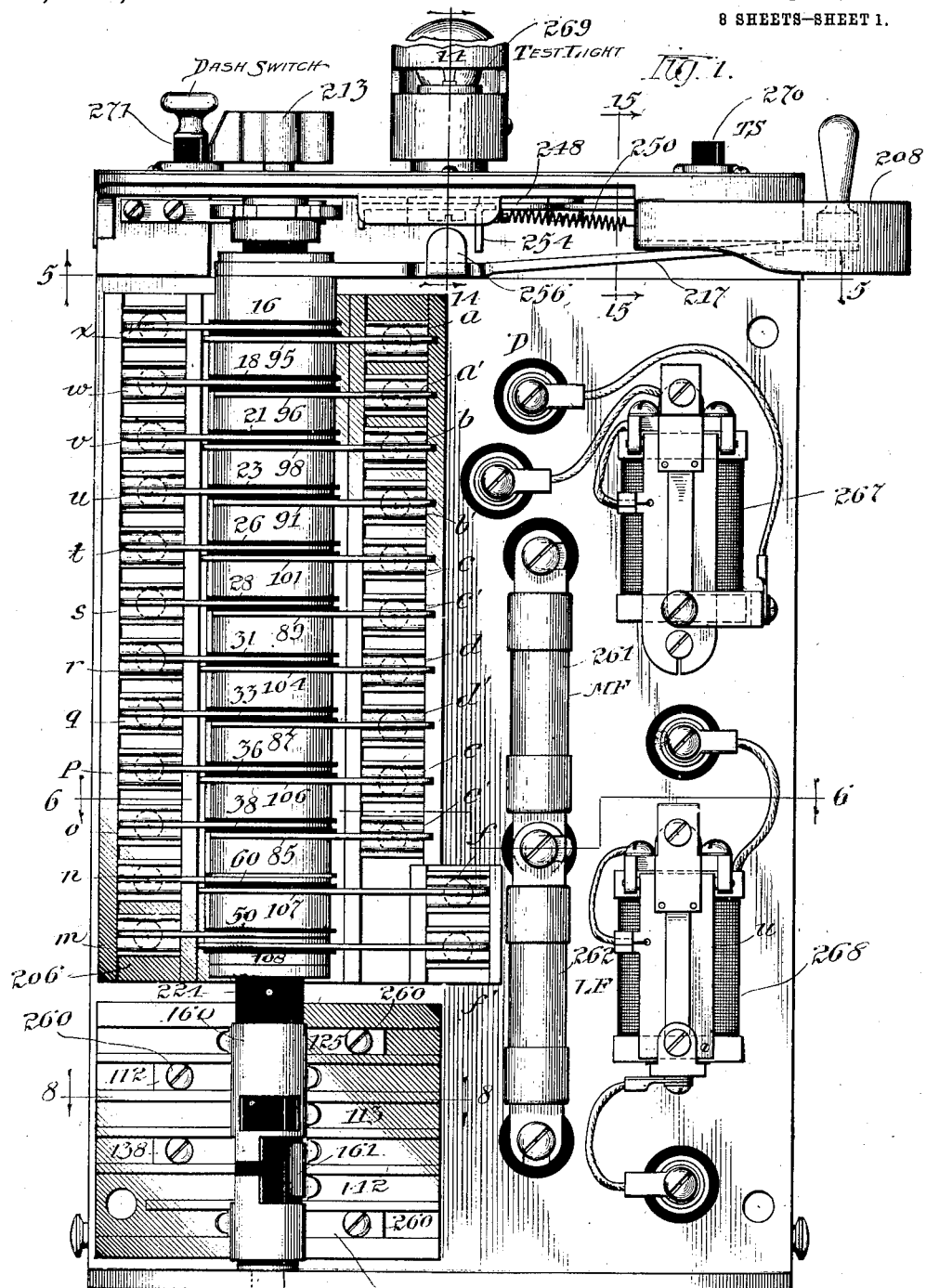

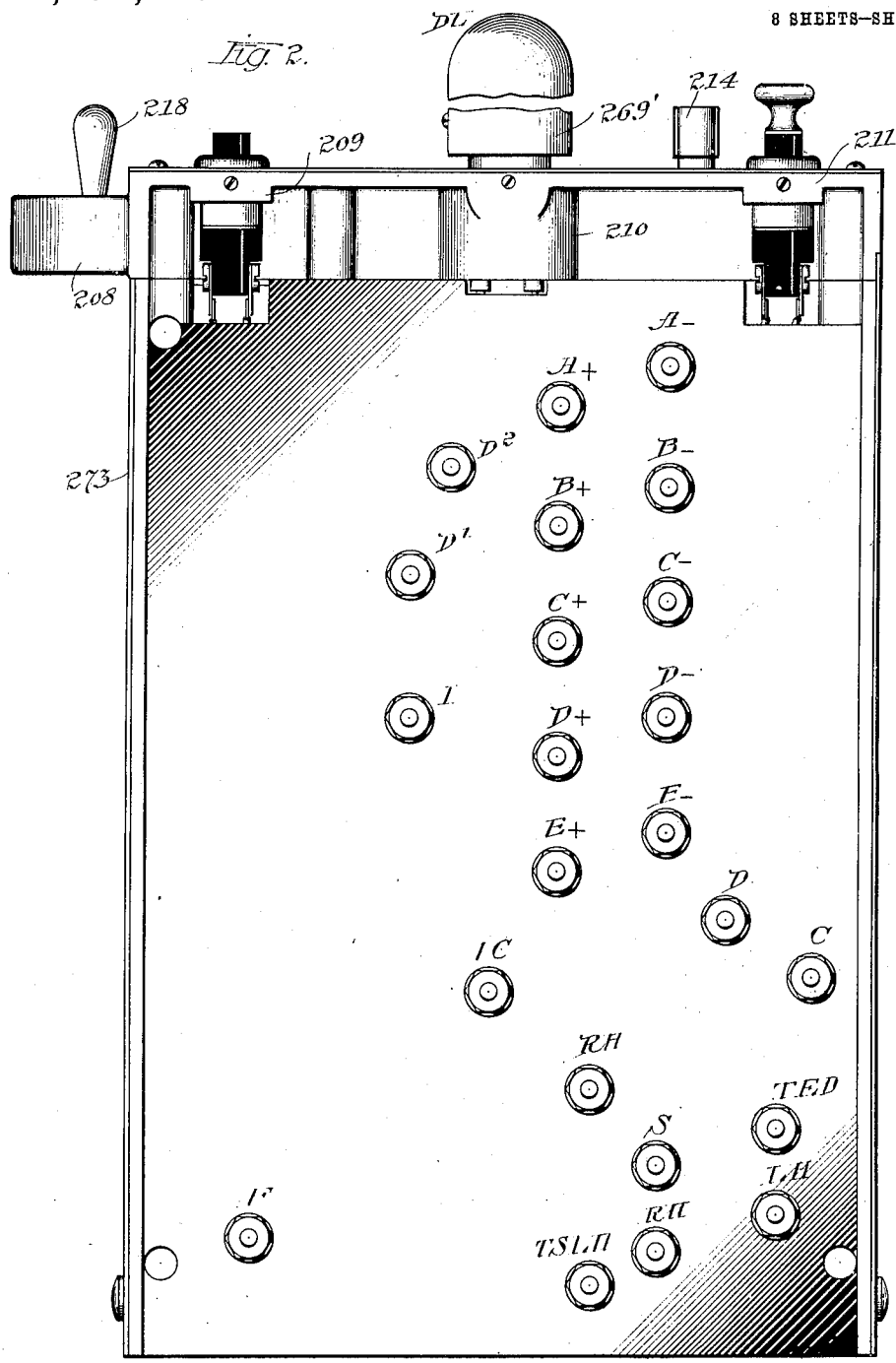

V. G. APPLE.
CONTROLLER SWITCH.
APPLICATION FILED AUG. 8, 1912.
1,070,657.
Patented Aug. 19, 1913.
8 SHEETS—SHEET 4.
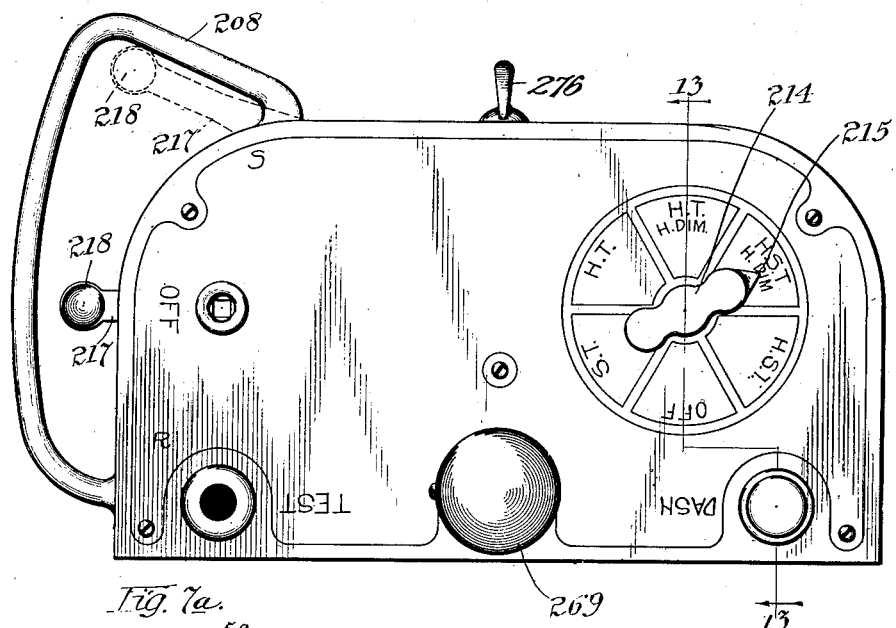
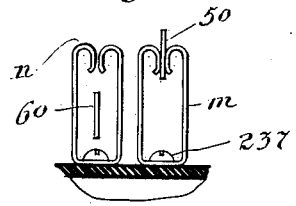
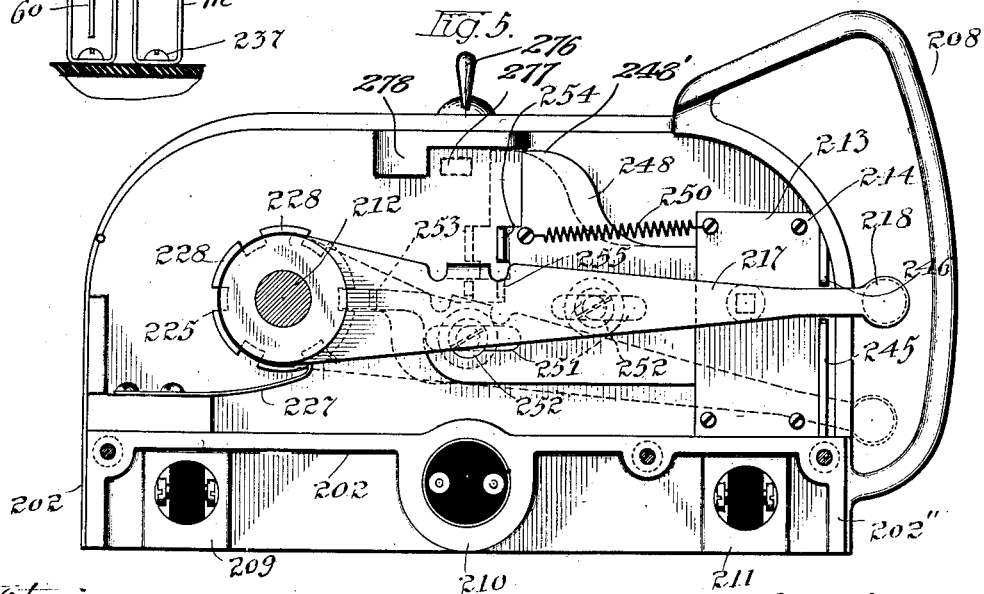

V. G. APPLE.
CONTROLLER SWITCH.
APPLICATION FILED AUG. 8, 1912.
1,070,657.
Patented Aug. 19, 1913.
8 SHEETS—SHEET 5.
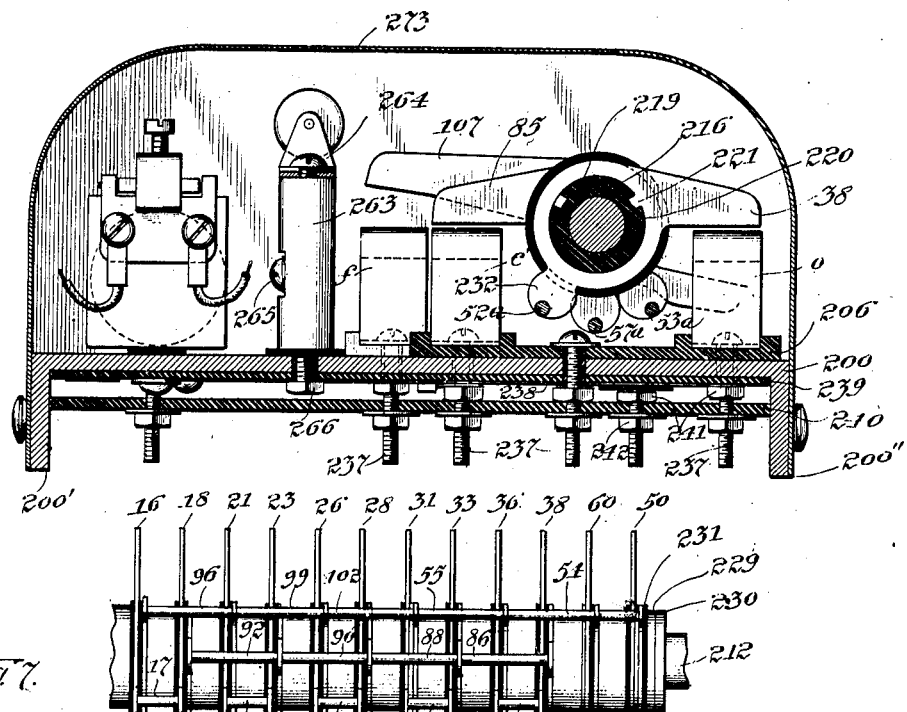
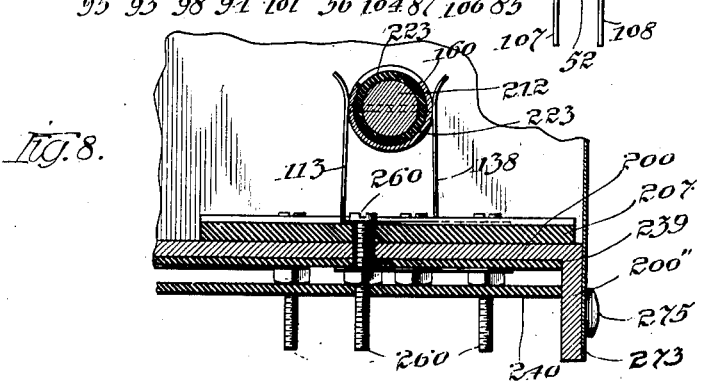
Witnesses:
Robert F. Weir
Arthur B. Franke
Inventor:
Vincent G. Apple

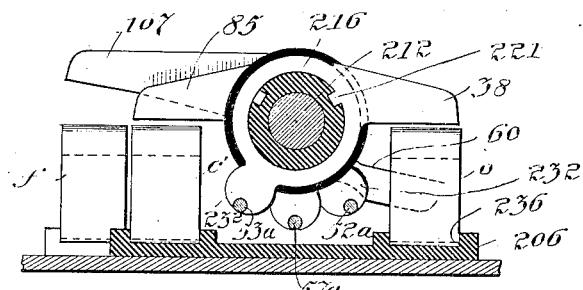
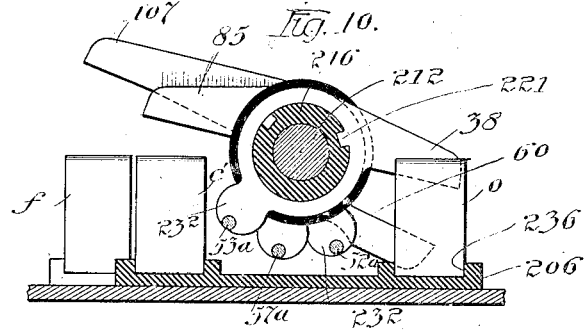
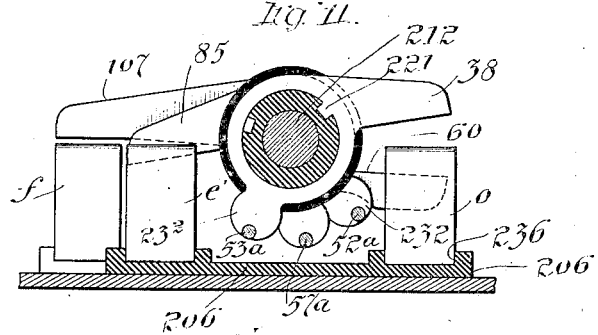
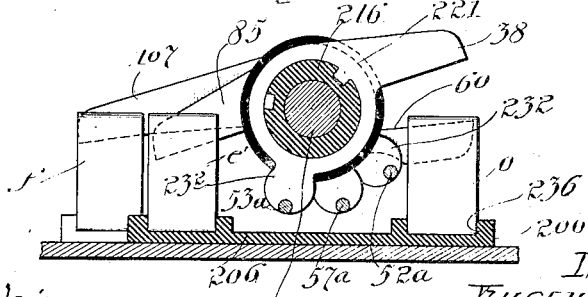

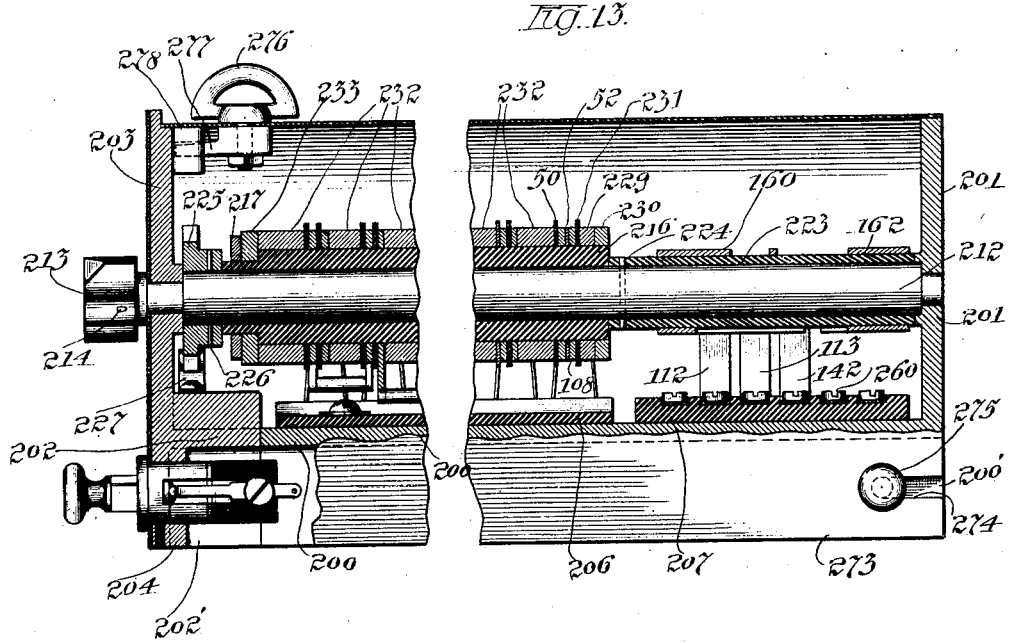
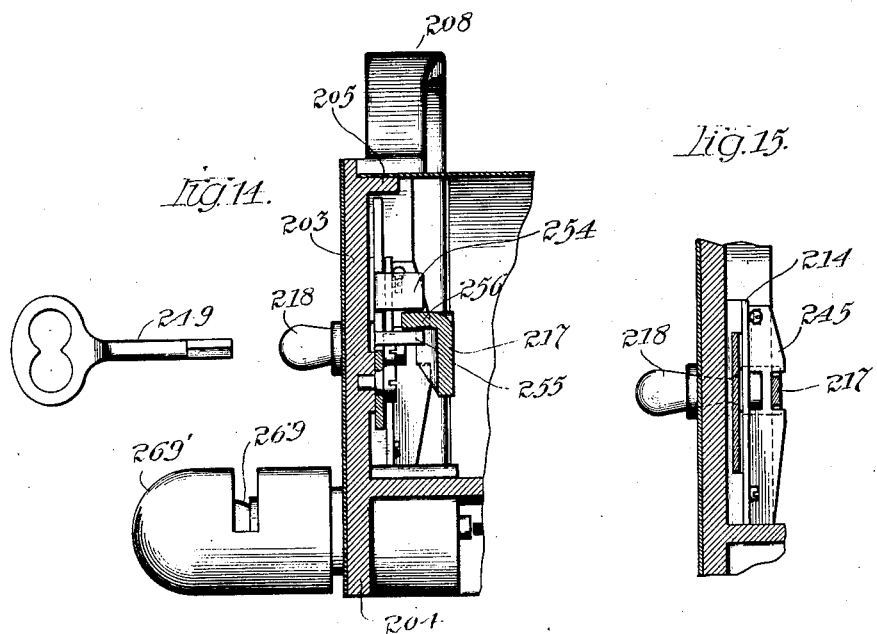

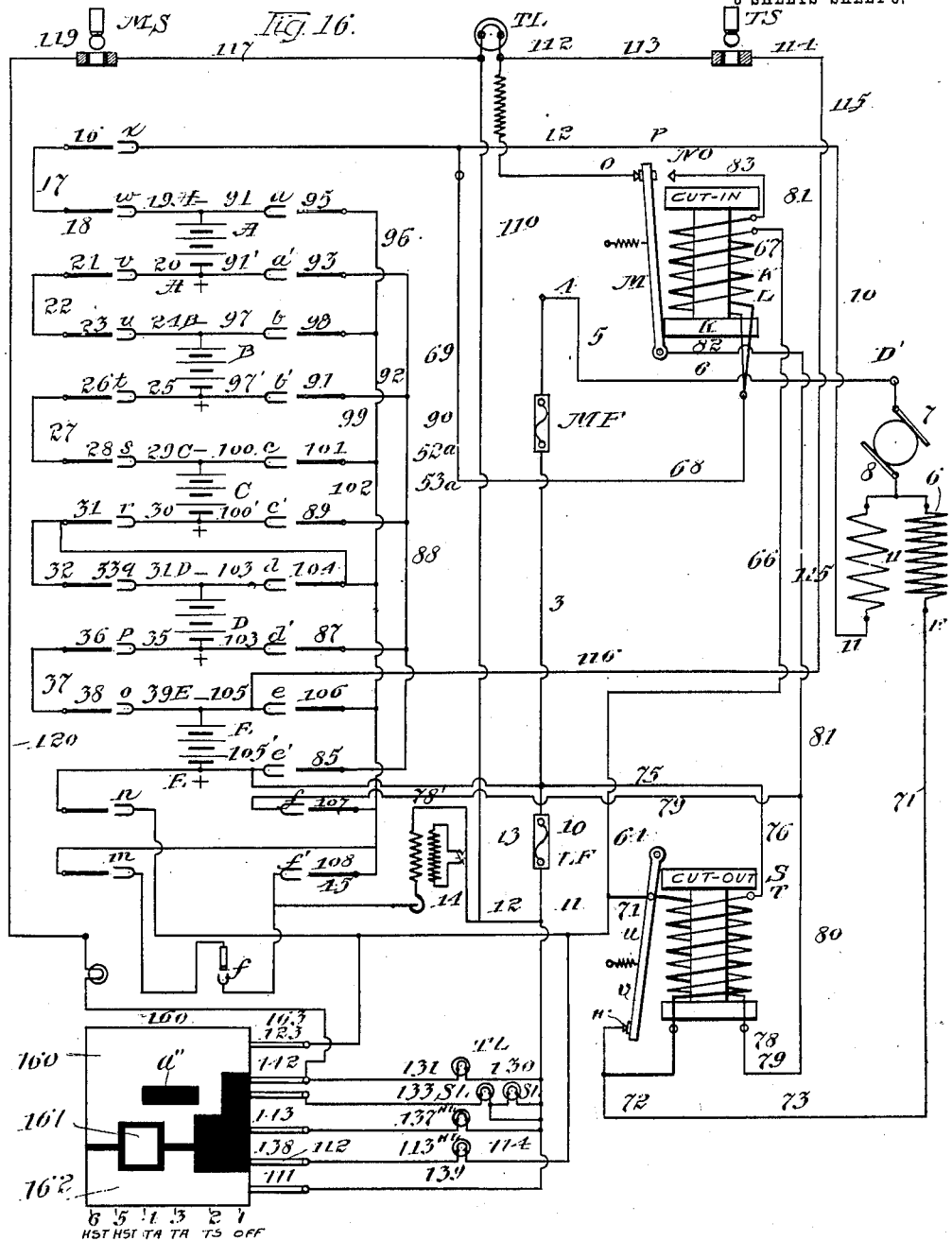

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

CONTROLLER-SWITCH.

1,070,657. Specification of Letters Patent. Patented Aug. 19, 1913.

Application filed August 8, 1912. Serial No. 714,086.

*To all whom it may concern:*

Be it known that I, VINCENT G. APPLE, a citizen of the United States, residing at Dayton, in the county of Montgomery and State of Ohio, have invented certain new and useful Improvements in Controller-Switches, of which the following is a specification.

My invention relates to improvements in controller switches for controlling the circuits of a dynamo electric machine and especially the relation of a dynamo electric machine with a storage battery.

One of the objects of my invention is to provide a switch, of the character to be hereinafter described, that is particularly well designed and adapted to be used in connection with a storage battery and a dynamo electric machine, whereby said battery may be connected in series relation with said dynamo, when using the dynamo as a motor, and in parallel relation with said dynamo electric machine when using said dynamo as a generator.

One of the particular objects of my invention is to provide a switch of the general character heretofore referred to which is especially adapted to be used in connection with a dynamo and storage batteries for starting an internal combustion engine employed for propelling automobiles, and for subsequently arranging the circuits so that the dynamo may be made properly to charge the said batteries when the engine becomes self propelling.

Other and further and more specific objects of my invention will be readily understood by persons skilled in the art from a consideration of the following description when taken in conjunction with the drawings, wherein—

Figure 1 is a front elevation of my controller switch with the cover removed; Fig. 2 is a rear elevation of the same showing the terminal binding posts for connection to the various circuits; Fig. 3 is a rear elevation showing the outer terminal board removed and showing some of the internal connections between the various parts of the said controller; Fig. 4 is a plan view of the controller showing the switch lever in off position; Fig. 5 is a cross sectional view taken on line 5—5 of Fig. 1, showing the top member of the frame and looking in the direction of the arrows; Fig. 6 is a transverse sectional view taken on line 6—6 of Fig. 1 looking in the direction of the arrows; Fig. 7 is a fragmentary view looking from the bottom toward the top of the rocking switch element, containing a series of switch blades adapted to make electrical contact with the respective stationary clips, of the controller switch; Fig. 7ª is a side view of two of the clips and respective blades; Fig. 8 is a transverse view of the lighting controlling switch taken on line 8—8 of Fig. 1; Figs. 9, 10, 11 and 12, are cross sectional views showing the various positions of the rocking switch element and the respective switch blades with reference to their respective coacting stationary clips; Fig. 13 is a central vertical section of the controller showing a part of the cover therefor in place; Fig. 14 is a transverse section taken on line 14—14 of Fig. 1; Fig. 15 is a similar section taken on line 15—15 of Fig. 1; Fig. 16 is a diagram of electric circuits connecting the dynamo electric machine and the batteries and diagrammatically including my present circuit controller.

In all the views the same reference characters are used to indicate similar parts.

The frame upon which the device is constructed includes two major portions. 200 is the rear wall of the major portion provided with a forwardly extending bottom portion 201, and a separable upper portion 202 provided with a top forward extension 203 and a rear extension 204. The top portion 203 is provided, near its front limit, with a downwardly extending flange 205. The frame could be made of a single integral piece, if desired, but I prefer to make it in two parts for convenience of structure, and for lightness I have made them of aluminum castings.

Mounted on the front wall of the frame and extending upwardly to a point approximating the parts 202, is a plate of insulating material 206. Another plate of insulating material 207 is also mounted on the front of the wall 200, upon which to mount the terminals of the lighting switch, which may be operated in conjunction with the circuit controller switch for the motor and batteries.

The upper part 202 of the frame is provided with side flanges 202′ and 202″ made integral therewith and a switch handle guard 208, extends outwardly from the main frame and serves as a protecting means to prevent accidental displacement of the switch handle bar which is employed to operate the moving elements of the controller. This upper portion of the frame is reinforced as at 209, 210 and 211, to provide receiving means for devices that are operable from the outer, and top portion of the controller.

In a copending application for a system of electrical distribution filed by me on the 22nd day of July, 1912, and identified by Serial No. 710,864, I have shown a system which is adapted to be carried into effect by the operation of the present controller, and in Fig. 16 of this case I have shown a diagram of circuits as they are presented in the aforesaid system case, the parts thereof being indicated by the same reference characters as those used in the former case, and in this case I have indicated the same parts with corresponding reference characters.

The rocking switch element of the controller, comprising a series of switch blades is shown in Fig. 7 and these parts are indicated and have the same office as similar parts shown in diagrammatic relation in Fig. 16.

A rotatable shaft 212 is supported in the frame 200 in bearings afforded by the flanges 201 and 203. It extends through the upper flange or plate 203 and is provided on this end with an indicating turning button 213, secured to the shaft by means of a pin 214. The button is pointed as at 215, more clearly shown in Fig. 4, which point serves as an indicator for showing the position of the shaft, and attached parts when they are rotated by means of the button. The specific object and function of which will be hereinafter more fully explained.

Mounted on the shaft 212 is a sleeve of insulating material 216, which is adapted to be freely rotated on the shaft by means of a handle 217 which is secured thereto and which terminates in a finger piece 218. The insulating sleeve 216, is longitudinally grooved, as at 219 and 220, and each of the switch blades is provided with an inwardly extending lug 221 for engaging either one or the other of the said grooves. For purpose of convenience of construction the blades of equal length are made in duplicates so that when the blades are either turned to the left or the right in assembling them on the sleeve, the projection 221 is adapted to enter either of the grooves 219 and 220 as the case may be and thereby the blades are secured on the sleeve to prevent relative rotation thereon.

On the shaft 212 is another sleeve 223, of insulating material, secured thereto by means of a pin 224, against this fixed sleeve the rotatable sleeve 216 of the controller abuts. A ratchet wheel 225 is provided with 6 teeth and corresponding depressions, and is secured to the shaft 212 by means of a pin 226. This ratchet wheel is provided with 6 teeth 228 and is resistingly held in the position to which it has been moved by the thumb button 213 by means of a spring pawl 227, so that the shaft 212 will be yieldingly retained in the position to which it has been placed for the purpose of operating the lighting switch.

The lighting switch, which is to be hereinafter described is operable quite independently of the controller switch, as the contacts thereof may be readily moved by turning the shaft 212, by means of the button 213, without disturbing the contact relation of the controller mechanism mounted upon the rotatable insulating sleeve 216.

In the construction of the controller switch, washers 229 and 230 are first mounted upon the insulating sleeve 216 and secured thereto by proper means. Then an insulating disk 231 is slipped over the sleeve and placed adjacent to washer 229 then one of the long blades of the switch controller, 108, is placed over the insulating sleeve having its projection 221 projecting into the groove 220, so as to hold the blade on the sleeve and prevent rotation. Each of the blades is provided with a radial projection as at 232 into which connecting wires such as 52ª, 53ª, and 57ª, may be soldered for the purpose of connecting the respective blades together, as shown in Figs. 7 and 16. It will be observed, by referring to Fig. 13 that a metallic washer 52 is placed between the blades 50 and 108 for the purpose of connecting them together. After the blade 52 has been placed in position on the insulating sleeve, a spacing washer 232 is threaded over the sleeve and put in contact with an insulating washer 231 and in this manner the entire mechanism, composing the oscillating element of the controlling device, is built up. After the last spacing ring 232 is placed over the sleeve, a washer 233 is placed over the reduced end of the insulating sleeve to hold the parts in assembled position and the switch moving lever 217 is then secured to the washer 233, and to the sleeve 216, by proper means, so that the assembled mechanism thereof may be oscillated when the lever 217 is moved laterally.

Looking at Fig. 1 it will be observed that the switch blades of the oscillatable mechanism, on the left hand side, indicated by the following reference characters in consecutive order, beginning at the top and ending at the bottom; 16, 18, 21, 23, 26, 28, 31, 33, 36, 38, 60, and 50, and the blades on the right hand side of the axis, are indicated by reference characters; 95, 96, 98, 91, 101, 89, 104, 87, 106, 85, 107, and 108, and that the respective coöperating stationary switch clips are indicated by $a, a', b, b', c, c', d, d', e, e', f$, and $f'$, and those on the left hand side are indicated by the reference characters $m, n, o, p, q, r, s, t, u, v, w$, and $x$.

The construction of the switch clips is clearly shown in Fig. 7ª wherein a single strip of spring copper or the like is bent upon itself having its ends inturned to form frictional contact surfaces for the respective blades. In this figure it will be shown that blade 60 when moving downwardly, severs its connection with its clips, while all of the other blades of the device sever their electrical connections with their respective clips when the blades are moved upwardly.

The clips are placed in grooves 236 made in the insulating plate 206 and are held in position by means of screws 237 which pass through perforations made in the base of the clips. The plate 200 is perforated for each of the screws and the perforations or holes, are insulated by bushings 238. A plate of insulating material 239, is placed over the bottom surface of the metal plate 200 to afford insulation therefor and the bushings 238 pass through the plates 206 and 239 as well as the plate of the main supporting frame 200.

All of the connections between the various screws on the back of the device are made as shown in Fig. 3, before the final plate 240 is placed in position and all of the screws that pass through this latter plate afford terminal binding posts for exterior circuit connections as shown in Fig. 2. The plate 240 serves as a protection for the interior connections that are contained between the plates 239 and 240. Screw nuts 241, serve to hold the screws in place and also serve as distance spacing means to hold the plates 239 and 240 apart to provide space for containing the interior connections, and other nuts 242, taking over the screws 237 serve as check nuts to hold the plate 240 in place and to prevent turning of the screws. Other nuts are provided for the screws 237 by means of which the terminal circuit connecting wires are secured to the said terminal screws.

When the moving member of the controlling switch, containing the switch blades, is rotated upon its axis, or the shaft 212, to the right, as shown in Fig. 10, and the switch blades on the left hand side, as shown in Fig. 1 are brought into contact with their respective switch clips, the storage batteries, with which the device is adapted to be used, in connection with the dynamo electric machine have all of the cells of which the batteries are composed connected in series relation with each other, and the highest electromotive force, of which the battery is capable, is expressed at the terminals of such connection and the battery so arranged, is connected to the dynamo electric machine as clearly shown in the diagram of connections of Fig. 16, so that the dynamo electric machine will become a motor and will be operated as such by the batteries when in series relation. Such a position of the switch blades and clips is shown also in Fig. 10.

When the switch is moved from position shown in Fig. 10 to position shown in Fig. 11, all of the circuits will be opened during this transit movement, as shown in Fig. 9 where none of the switch blades are making contact with their respective clips. When the switch moving element is oscillated further, in the direction shown in Fig. 11, the blades make contact as shown in Fig. 12, with their respective clips and the batteries are connected in parallel relation with each other and with the dynamo, in condition for charging by the dynamo when the driving engine becomes self propelling.

A lock plate 243, is secured to the part 202, by means of screws 244. It is provided with a down turned flange 245. The flange is tapered toward each extremity from the intermediate notch 246. The switch moving lever 217, has sufficient spring tension to cause it to snap into the notch 246 when it is moved across the flange 245. When the lever is in the notch the oscillating switch element is in the position as shown in Fig. 11. That is to say, that all of the blades on the right hand side of the axis of the moving element, as shown in Fig. 1 make contact with their respective clips, with exception of blades 107 and 108, and by this latter means the igniting circuit, for the internal combustion engine is broken, but the lighting circuits for maintaining the lamps lighted, as will be hereafter explained, remain closed.

When the handle 218 of the lever 217 is moved to the position shown in dotted lines and marked S in Fig. 4, which signifies "starting position", the parts of the controller are in the position shown in Fig. 10, wherein the batteries are connected in series relation with each other and with the dynamo, and the dynamo is in condition to operate as a motor for starting said engine. After the engine has become self propelling it becomes desirable to connect the batteries in parallel relation, and this may be done by quickly moving the lever 217 from the position shown in dotted lines marked S, to the extreme position shown, marked R, or "running position". Then the switch blades are in position as shown in Fig. 12, in which all the circuits on the right hand side, as shown in Fig. 1, are closed and in which the switch blades 60, upon its upward movement make electrical contact with its respective clip, it being the only switch, at this time, on the left hand side that is closed.

Underlying the plate 243 and laterally movable by means of a key 249, is a locking plate 248, provided with means for locking the lever 217 in off position for locking the inclosing casing 273 and for locking the shaft 212 so that it cannot be rotated until the device has been unlocked. The plate 248 is moved in the opposite direction to that in which it has been moved by means of the key, by a spring 250. The plate is provided with two guiding slots 251, in which screws 252 prevent the lateral movement of the plate 248. The locking plate 248, is provided with downturned lugs 253, 254 and 255. The lug 253 engages the notches between the teeth 228, of the ratchet wheel 225, so as to prevent the rotation of the lighting switch, and the shaft 212, when the plate 248 is in locked position, at which time the projection 248', of the locking plate 248, engages the locking tongue 277 and prevents turning of the button 276 and thus the casing, or cover 273 may not be removed when the key is turned to move the locking plate 248 to locking position. The lever 217 is provided with an upturned lug 256, shown in Fig. 14, which is contained between the lugs 254 and 255 of the locking plate, at the time when the locking plate is moved to locked position and when the lever 217 is in the notch 246. By this means the moving parts of the controlling device are locked against unauthorized use, and when the parts are in this position the engine cannot be started because the igniting circuit is open. When the key is turned to unlocking position the plate 248 is immediately moved to corresponding position by means of the spring 250 and the lugs 253, 254 and 255, are withdrawn from engagement with the moving instrumentalities leaving them free to be moved for performing their respective and intended functions.

The lighting switch, or the switch by means of which the electric lights of an automobile, for instance, are controlled, is mounted on the insulating sleeve 223 which is secured to the extending end of shaft 212. Contact plates 160, 161 and 162, are secured on this sleeve and are shown protracted in diagram Fig. 16, and the connections that are effected by the rotation of these parts, as when the shaft 212 is turned, is clearly disclosed in this figure and they are more specifically explained in my copending application for a system of electrical distribution to which I have heretofore referred.

From the foregoing description it will be obvious that the lighting switch is operable quite independently of that portion of the switch constituting the control for the dynamo and for the storage batteries, and that both operating instrumentalities are capable of being locked in given positions by means of the same lock and key.

The spring pressed coacting switch terminals, for the rotating portion of the lighting switch are indicated by 112, 113, 125, 138, 141 and 142. These contact members are relatively stationary and have frictional yielding bearing upon the rotatable contact members. They are placed in grooves, in the insulating base plate 207 and are held in positions by means of screws 260 which pass through the plates 200, 239 and 240 just as the screws 237 are employed to support the clips of the motor controller, and as clearly shown in Fig. 8.

Safety fuse devices 261 and 262, also indicated by M F, and L F, respectively, are mounted upon post, or pillars 263, of which there are three pillars supporting the terminals of the respective fuses that are secured thereto by screws 264. Screws 265, have engagement with the terminal posts 263, for connection of electric circuits, and these posts are secured to the base 200, by means of bolts 266 taking through the said base plates and insulated therefrom.

An electro magnetic relay 267, serves as an automatic means for cutting the dynamo into circuit with the storage batteries at the time when the electromotive force, due to the speed of the dynamo, equals or exceeds, that of the batteries. An electro magnetic relay 268, serves as a means for decreasing the electromotive force, at a given speed of the dynamo, when the storage batteries have been partially or completely charged thereby automatically decreasing the current supplied to the storage batteries when they no longer require the full current that can be produced by the dynamo. The function and operation of these magnetic relays are fully disclosed and claimed in my copending application for electrical distribution systems, to which I have heretofore referred.

A test light 269 is mounted on the upper part of the casing and is capable of being placed in circuit by means of a switch 270. While this indicates the relative condition of the dynamo electric machine and storage batteries, at the same time it serves to illuminate the top of the casing so that the key may be readily inserted in the lock, for instance, or the button 213, of the lighting switch may be rotated to the desired position indicated by the scale on top of the casing. A similar switch 271, may be used for lighting the electric lamp usually placed on the dash board of an automobile and it is so arranged that the light will continue to burn as long as the switch has been placed in the desired position to which it has been moved. For purposes of mechanical construction and economy of space the switch is represented as an axially movable push switch.

An inclosing casing 273, as shown in Fig. 6, is designed to inclose the apparatus, constituting the moving parts of the controlling mechanism, it is slotted, as at 274 and buttons 275, secured to the frame 200 of the device, engage the inclosing casing and serve as means upon which the casing may be rotated when unlatched from the main frame. The slots also permit the entire removal of the casing, when desired.

A latch 276 is provided with a locking tongue 277 that engages a projection 278 on the frame part 203.

The general use and operation of the device will be apparent from the foregoing description.

Having described my invention what I claim is:

1. A controlling switch of the character described, comprising a frame, an oscillatable switch element, stationary coacting terminals on each side of the axis thereof, a lever for oscillating said element extending laterally therefrom and key-operated means comprising a movable key-operated member and a coacting lever-carried part, one of said coacting parts being shaped to provide a space to receive the other at one point in the path of movement of the lever-carried part, said point being reached by said lever-carried part when the lever is in an intermediate position, for locking said lever against movement from said intermediate position, with said switch element in contact with neither stationary terminal.

2. A controlling switch of the character described, comprising a frame, suitable terminals exposed from the rear face of the frame, a rotatable shaft on said frame having one of its ends extending therefrom, exterior means for turning said shaft, a lighting switch adapted for rotation by said shaft, stationary coacting terminals therefor, a motor and battery controlling switch element mounted for oscillation movable independently of said shaft, stationary terminals coacting therewith, a lever for oscillating said movable element extending laterally therefrom and means for locking the movable elements of both said switches.

3. A controlling switch of the character described comprising a frame, an oscillatable switch element comprising a series of insulated switch blades projecting laterally from opposite sides of said element, supported on said frame, coacting switch terminals or clips on each side of the axis of said oscillatable element for engagement with said blades, a dynamo electric machine, a series of storage batteries, suitable terminals for said clips exposed on the rear face of the frame for connecting said device to the dynamo electric machine and to the series of storage batteries, by engagement of said element with the clips on one side or the other of said switch, a lever secured to said oscillatable element and extending laterally therefrom for movement of the said element whereby the batteries may be connected in series relation with the said dynamo upon movement of said lever in one direction and in parallel relation with said dynamo upon movement of said lever in the opposite direction.

4. A controlling switch of the character described, comprising a frame, suitable terminals exposed upon the rear face of the frame, a rotatable shaft secured on the front face of the frame having one of its ends extending therethrough, a lighting switch operable by rotation of the said shaft, a movable element of a motor and battery controlling switch supported for oscillation on said shaft, a plurality of stationary switch clips on either side of the said shaft having suitable terminals extending to the rear of said frame, a casing surrounding said switches and secured to said frame to inclose said switches, a laterally extending lever for moving the oscillatable element of said motor controlling switch extending without said casing, means for limiting the movement of said lever whereby the terminals of the oscillating element are brought into contact with one set of stationary terminals or clips when the lever is moved to its full extent in one direction and the other set of terminals or clips are brought into contact with the movable terminals when the lever is moved to its full extent in the opposite direction and means for engaging the switch moving lever at an intermediate position for holding certain of the movable switch terminals out of engagement with their respective stationary terminals.

5. A controlling switch of the character described, comprising a frame having a flat back and forwardly extending flanges to form walls of an inclosing casing, a rotatable shaft having bearings in said flanges and provided with an outwardly extended end at its upper terminal, shaft-turning means secured to said end, a lighting switch member adapted for movement by said shaft, coacting stationary switch elements extending to the rear face of the frame, an oscillatable switch member carrying a plurality of switch elements mounted for support on said shaft, coacting switch terminals on each side of the axis of said member for engagement with said elements respectively, a laterally extending lever for moving said oscillatable member, extending beyond the inclosing casing, and a removable cover providing, in conjunction with said flanges an inclosing casing for said switch moving parts.

6. A controlling switch of the character described, comprising a frame having a flat back plate, three edges of said plate being shaped to provide rearwardly extending side and top flanges inclosing a space for conducting wires back of said plate, the fourth edge of said plate shaped to leave the bottom of said space open for accommodation of said wires; flanges extending forwardly from the top and bottom edges of said plate; a removable closure coacting with said back plate and flanges to provide a switch-inclosing casing; switch mechanism within the casing thus produced; and switch operating means extending beyond the casing for operation of the movable switch instrumentalities within said casing.

7. A controlling switch of the character described, comprising a frame, a supporting shaft mounted thereon, two sets of stationary switch contacts on different sides of said shaft, a switch element adapted for oscillation on said shaft consisting of a sleeve of insulating material having two longitudinally extending grooves in the outer surface thereof, duplicate switch blades for support on said sleeve each blade having an inwardly extending lug for engagement with either one or the other of said grooves determined by the side from which said blade projects from said sleeve, for coöperation of any one of said duplicate switch blades with one or the other of said sets of stationary switch contacts.

8. A controlling switch of the character described, comprising an oscillatable switch element, two sets of stationary contacts differently located with respect to said oscillatable switch element, a cylindrical insulating support having two longitudinally extending grooves in the outer surface thereof, duplicate switch blades each consisting of an annulus of conducting material having a blade part projecting therefrom, and each provided with an inwardly extending means for engagement with one or, by reversal of said duplicate blade, with the other of said grooves determined by the side from which said blade shall project from said insulating support for coaction with the respective set of stationary contacts and insulating spacing means between said blades.

9. In a controlling switch of the character described for connection with a dynamo electric machine and suitable storage batteries, a frame, a casing, associated therewith, a switch within the casing for connecting said dynamo and batteries in series relation and in parallel relation, alternatively, and means within the casing for automatically establishing and completing the circuit through said connections when the switch has been moved for effecting said series connection.

10. In a controlling switch of the character described for connection with a dynamo electric machine and suitable storage batteries, a frame, a casing associated therewith, a switch within the casing for alternately connecting said dynamo and batteries in series relation when the dynamo is to be used as a motor, and in parallel relation when the dynamo is to be operated as a generator to charge the batteries, and means within the casing to automatically reduce the current from said dynamo when the electromotive force of the batteries is raised by charging.

11. In a controlling switch of the character described for connection with a dynamo electric machine, suitable storage batteries and a lighting system, comprising a frame, a casing associated therewith, a switch within the casing for alternatively connecting said dynamo and batteries in series relation when the dynamo is to be used as a motor and in parallel relation when the dynamo is to be operated as a generator to charge the batteries, and a lighting switch, within said casing operable mechanically independent of said controller switch but electrically dependent thereon.

12. A controlling switch of the character described comprising a frame, an oscillatable shaft mounted therein, movable contacts carried by said shaft, a wheel carried by said shaft and provided with depressions, a lever for oscillating said contacts extending laterally therefrom, and means for locking said shaft and lever in predetermined position comprising a lock plate, said plate having portions for coaction with said lever when the lever is in said predetermined position and portions for engagement in said depressions of the wheel when the lever-engaging portions of said plate are in engaging position.

13. A controlling switch of the character described comprising a frame, an oscillatable shaft in said frame, movable contacts carried thereby, a lever for oscillating said contacts extending laterally therefrom, the end of said lever extending beyond said frame, and a handle-guard (208) carried by said frame in the plane of movement of said lever but beyond the end thereof.

14. A controlling switch of the character described comprising a frame, a shaft rotatably mounted therein, movable contacts carried by said shaft, a switch element oscillatable on said shaft, said shaft and oscillatable switch elements each having parts for coaction with a locking member, and a locking member movable to engage said coacting parts of the shaft and oscillatable switch element to lock both thereof in predetermined position.

15. A controlling switch of the character described comprising a frame, a shaft rotatable in the frame, a switch element carried by the shaft and oscillatable thereon, movable contacts carried by the shaft at one end thereof, a lock-engaging member carried by said shaft at the other end thereof, a laterally extending lever connected to said switch element adjacent said locking member of the shaft, and means for engagement of said locking member and of said lever to lock the parts in predetermined positions.

16. A controlling switch of the character described, comprising a frame, having upper and lower forwardly extending flat portions; a shaft carried by the frame and journaled in said frame extension; two insulating contact-carrying sleeves upon said shaft, one oscillatable independently of said shaft, and one rotatable therewith; rotatable means for said shaft extending to the outside of the frame; an index therefor to indicate the extent to which said shaft is rotated; movable contacts upon each of said sleeves; coöperating contacts carried by said frame; means for moving said oscillatable sleeve and stops for limiting the movement of the movable means at both limits of its movement and at an intermediate point.

17. A controlling switch of the character described comprising a frame having a base and opposite forwardly extending portions, a shaft journaled in said portions for rotation above said base, an insulating sleeve secured to said shaft at one end thereof within the adjacent forwardly extending portion of the frame, a lock-engaging means secured to said shaft at the other end thereof within the other adjacent forwardly extending portion of the frame, a switch element mounted for oscillation upon said shaft between said two shaft-carried parts, a laterally extending lever for oscillating said switch element, said lever connected to said switch element adjacent to said lock-engaging member of the shaft, and means for engagement of said shaft-carried lock-engaging member and of said lever to lock the parts in predetermined positions.

18. A controlling switch of the character described comprising a frame, a supporting shaft mounted therein, two sets of stationary switch contacts on different sides of said shaft, a switch element adapted for oscillation on said shaft consisting of a sleeve of insulating material having two longitudinally extending grooves in the outer surface thereof, duplicate switch blades for support on said sleeve, each blade having an inwardly extending lug for engagement with either one or the other of said grooves determined by the side from which said blade is to project from the sleeve for coöperation of any of one of said duplicate switch blades with one or the other of said sets of stationary switch contacts, and each blade having a radial projection whereby those blades which have their inwardly extending lug in the same groove of the insulating sleeve have their radial projections alining; and means extending from one to the other of said alining radial projections for electrical connection of similarly disposed blades.

19. A controlling switch of the character described comprising a supporting shaft, a switch element thereon comprising a sleeve having blade-engaging grooves therein, a plurality of blades adapted to be inserted upon said sleeve some to extend in one direction and some in another direction therefrom, stationary clips upon opposite sides of said shaft adapted to coact with the blades which extend in one direction when the blades extending in the other direction are out of contact with their stationary contacts, and additional switch means comprising a stationary contact upon one side of said shaft and a movable contact secured to and extending from said sleeve in the same direction but in a different plane from that of the blades for coaction with the stationary contacts on the same side, whereby said additional blade is adapted to engage with its stationary contact when the oppositely extending blades coact with their stationary contacts.

20. A controlling switch of the character described comprising a frame having a base and upper and lower forwardly extending flat portions, a shaft carried by the frame and journaled in said forwardly extending portions of the frame, suitably insulated movable contacts carried by said shaft, stationary contacts carried by the base of said frame for coaction with said movable contacts, means to lock said contact-movable means in an intermediate position of its movement, means to move said movable contacts, and a casing member coöperated with said shaft-supporting frame portion to inclose said shaft and appurtenant parts.

21. A controlling switch, of the character described, comprising a frame; a removable cover, or casing therefor; a switch within the casing having an operative part extending to the outside thereof, and locking means to lock said switch-operative means to prevent movement and coincidently to lock said cover, or casing, against removal from the frame.

22. A controlling switch, of the character described, comprising a frame; a removable cover therefor; a shaft rotatably mounted in said frame; movable contacts carried by said shaft; means for rotating said shaft, extending to the outside of said casing; a switch element oscillatable on said shaft; means for moving said oscillatable switch element extending to the outside of the casing; co-acting, stationary contact switch elements for said movable switch elements; and a locking member movable to lock said switch moving means and said casing against movement of said parts.

In testimony whereof I hereunto set my hand in the presence of two witnesses.

VINCENT G. APPLE.

In the presence of—
N. E. SNYDER,
WM. V. MOTE.